United States Patent Office 3,565,834
Patented Feb. 23, 1971

3,565,834
PRODUCTION OF POLYAMIDE MOLDINGS
Karl Dachs, Ludwigshafen, and Hans Wilhelm, Heinsheim, Germany, assignors to Badische Anilin- & Soda-Fabrik Aktiengesellschaft, Ludwigshafen (Rhine), Germany
No Drawing. Continuation-in-part of application Ser. No. 490,086, Sept. 24, 1965. This application Dec. 11, 1968, Ser. No. 783,141
Claims priority, application Germany, Oct. 9, 1964, P 14 95 202.4
Int. Cl. C08g 20/18
U.S. Cl. 260—2.5      4 Claims

ABSTRACT OF THE DISCLOSURE

Production of polyamide moldings which can be used as rollers, gear wheels or pipes by activated anionic polymerization of a lactam in the presence of an anionic catalyst and a catalyst wherein said lactam is polymerized in the presence of, and is reacted during polymerization with, a polyepoxide. Also, production of viscoelastic foams by employment of gas-producing foaming agent in reaction mixture.

---

This applicataion is a continuation-in-part of application Ser. No. 490,086 filed Sept. 24, 1965 (abandoned).

This invention relates to a process for the production of polyamide foam structures and other articles of polyamides by activated anionic polymerization of lactams in molds, which may be rotated, the polymerization being carried out in the presence of epoxides.

The production of polyamide moldings by activated anionic polymerization of lactams in molds, which may be rotating molds, is already known. Moldings, for example rollers, which have been prepared by the methods of centrifugal casting or rotational molding, often have high internal stresses which may result in the rollers cracking under load, for example when used in calenders. If the activated anionic polymerization be carried out in the presence of compounds which form gaseous substances when heated, rigid foams are obtained from polyamides. These rigid foams are too brittle for some purposes.

It has also been proposed to react polyamides prepared by hydrolytic polycondensation with ethylene oxide. Products having improved solubility are obtained but they are so soft that they cannot be used as materials of construction.

Furthermore, it is known from U.S. Pat. 3,338,985 that molded articles of polyamides prepared by hydrolytic polycondensation can be irradiated and reacted with polymerizable olefinically unsaturated monomers, such as glycidyl acrylate, which bear epoxy groups. Different adhesion properties are imparted to the surface of the molded article by this treatment (a permanent "anchor surface" is grafted onto the polymer substrate). However, it is not possible by this process involving high expenditure for equipment to also improve the properties of the interior of thick-walled moldings and yet to retain certain typical properties of the polyamide material.

It is an object of this invention to provide a process for the production, in a simple manner, of polyamide moldings which are practically stress-free and not brittle but resilient to a high degree from easily accessible starting materials by activated anionic polymerization of lactams. It is a further object of this invention to provide a process which enables moldings of any size to be manufactured directly in molds without there being any need to aftertreat said moldings and which can be carried out rapidly and in one step. It is another object of this invention to improve some of the properties of the material from which the moldings are made and yet to substantially retain the typical characteristics of a polylactam. It is yet another object of the invention to provide a process in which the normal course of activated anionic polymerization which is sensitive to disturbing influences is interfered with as little as possible so that conventional industrial processing methods can be substantially retained. It is a further object of this invention to provide a process for the production of polyamides or polyamide moldings which process can also be used to prepare foams from polylactams which have improved viscoelastic properties, good resilience and improved vibration damping properties.

We have now found that polyamide moldings can be prepared advantageously by activated anionic polymerization of lactams, in the presence or absence of compounds which form gaseous substances when hot, in stationary or rotating molds at elevated temperature, by carrying out the polymerization in the presence of 1 to 10% by weight of epoxide, i.e. a polyepoxide.

Polyamide moldings prepared in accordance with this invention have many advantages; rigid polyamide foam is viscoelastic, has good resilience and does not afterharden; moreover it has a marked vibration damping capacity and a high thermal stability under load; unexpanded moldings, such as rollers, are practically stress-free and very tough and the properties of the material are practically uniform all the way through the molding.

These results and the fact that the process can be carried out very easily are surprising because it is known that compounds having hydroxyl groups, such as alcohols, disturb anionic polymerizations, and also it is known that hydroxyl groups are formed in the reaction of compounds having labile hydrogen atoms, such as lactams or polyamides, with epoxides. It was also not to be expected that the lactams (which react with each other very rapidly in activated anionic polymerization) would react with epoxides during the short reaction period because it is known that epoxides can only be reacted with polyamides with difficulty.

It is clear to the skilled worker who has a knowledge of this invention that commercially available low molecular weight epoxides having two or three 1,2-epoxy groups are suitable for use in the process according to this invention provided that they have a neutral reaction.

Epoxides are defined as compounds containing at least once in the molecule the following grouping:

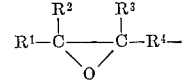

in which $R^1$, $R^2$, $R^3$ and $R^4$ denote hydrogen atoms and/or hydrocarbon radicals having two to twenty, in particular three to twenty, carbon atoms and which contain epoxy groupings; $R^1$ and $R^3$ may be joined together by carbon or hetero atoms. Examples of such compounds are butadiene dioxide, vinylcyclohexene dioxide and bis(3,4-epoxy-6-methylcyclohexyl)hexane.

Very suitable epoxides are those having the formula

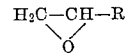

in which R stands for a hydrocarbon radical having 2 to 20, particularly 2 to 14, carbon atoms and preferably aliphatic radical bearing epoxy groups. Epoxides are also suitable in which some of the hydrogen atoms of the organic radicals ($R^1$, $R^2$, $R^3$ and $R^4$) are replaced by groupings or atoms having a neutral reaction, as for example —C≡N, hydrocarbon—CO·O,

oxygen, sulfur, nitrogen,

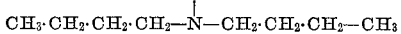
or $CH_3 \cdot CH_2 \cdot CH_2 \cdot S$-radicals.

Compounds having two to six, especially two to three, epoxy groupings are particularly suitable, in particular polyglycidyl ethers of low molecular weight compounds having at least two hydroxyl groups in the molecule, such as

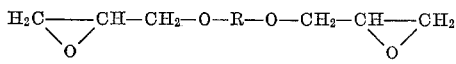

in which R denotes a divalent aliphatic, aromatic or araliphatic hydrocarbon radical having two to fifteen, in particular two to fourteen, carbon atoms, for example the polyglycidyl ether of butanediol-1,4, propanediol-1,2 or ethylene glycol which may be prepared for example by the processes described in U.S. Pats. 2,898,349 and 3,096,349; corresponding commercially available polyglycidyl ethers of low molecular weight aliphatic alcohols having more than two hydroxyl groups, in particular those having up to 5 carbon atoms, such as

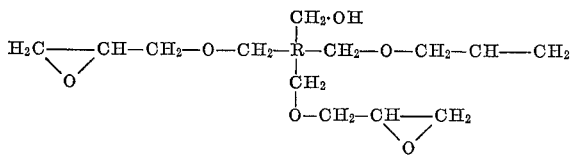

in which R denotes a tetravalent hydrocarbon radical, as for example

the polyglycidyl ethers of glycerol or the well known polyglycidyl ethers of bisphenols such as

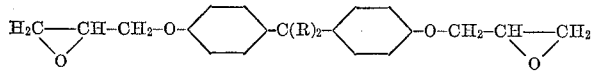

in which R denotes hydrogen or an aliphatic hydrocarbon radical having one to six carbon atoms in particular hydrogen and/or methyl.

Other epoxies which are suitable have the following formulae:

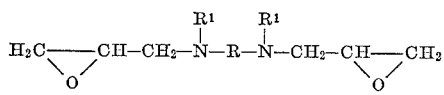

in which R denotes a divalent hydrocarbon radical as for example —$(CH_2)_4$— and $R^1$ denotes an aliphatic hydrocarbon radical having one to six carbon atoms, for example N,N' - diglycidyl-N,N'-dimethyl-hexamethylenediamine-(1,6), and

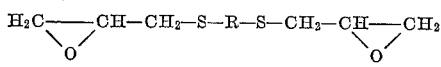

in which R denotes a divalent hydrocarbon radical, having up to 20 carbon atoms, for example diglycidyl ether of 1,4-butanedithiol.

The epoxies, alone or mixed together, are advantageously used in amounts of 1 to 10%, with reference to the weight of lactam used.

In particular, it can be said that the invention resides in an improved process for the production of polyamide moldings by activated anionic polymerization of a lactam having seven to thirteen ring members in the presence of an anionic catalyst and a cocatalyst, the improvement comprising carrying out the polymerization of said lactam after having added, i.e. in the presence of and reacting therewith during the polymerization reaction, 1 to 10% by weight, based on said lactam, of a low molecular weight epoxide compound with two to three epoxy groupings and having the formula

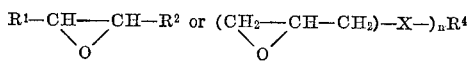

wherein $R^1$ denotes a hydrogen atom or a hydrocarbon radical having up to 20 carbon atoms, $R^2$ denotes a hydrocarbon radical bearing an epoxy group and having 2 to 20 carbon atoms, with the proviso that $R^1$ and $R^2$ may be joined together as part of a cyclic hydrocarbon ring, X denotes —O—, —S— or >$NR^3$, $R^3$ being an aliphatic hydrocarbon radical having one to six carbon atoms, $R^4$ denotes a hydrocarbon radical having two to twenty carbon atoms or an aliphatic hydrocarbon radical bearing a hydroxyl group as substituent and having up to 5 carbon atoms, and $n$ denotes 2 or 3.

Conventional methods of activated anionic polymerization of lactams are suitable for the production of the new type of polyamides. If the polymerization is carried out in the absence of compounds which form gaseous substances when heated, stress-free solid shaped articles are obtained. To prepare moldings by the methods of centrifugal casting or rotational molding, for example the lactam melt already containing the catalyst and an epoxide has added to it, prior to the melt being poured or injected into the rotatable mold, one or more activators which are uniformly distributed in the melt. It is also possible to add the catalyst to one portion of the melt and the activator to the other portion and to mix the two portions of the melt for example by mixing nozzles during their introduction into a rotatable mold. Heated molds which have rotation symmetry in relation to at least one axis are suitable as rotatable molds. It is advantageous to heat the molds to temperatures of from 80° to 200° C. prior to the introduction of the polymerization mixture composed of lactam, activator cocatalyst, catalyst and epoxide, if desired with other additives. The molds may be rotated during the polymerization, in rotational molding so that the radial acceleration of the molten polymerization mixture is less than the acceleration due to gravity ($g$), and in centrifugal casting so that it is higher than $g$.

Viscoelastic polyamide foam structures as well as solid moldings may be prepared by the process according to the invention, for example by uniting a lactam melt containing an activator and an epoxy compound with a lactam melt in which a catalyst is dissolved and polymerizing this polymerization mixture with expansion in a mold at least partly heated to polymerization temperature, after the addition of a compound which forms gaseous substances when heated (expanding agent). The epoxy compound may also be dissolved in a liquid expanding agent and added with the latter to the polymerization mixture.

Examples of suitable lactams having seven to 13 ring members are caprolactam, oenantholactam, capryllactam, capric lactam, laurolactam or C-substituted derivatives of these lactams, such as 3-methylcaprolactam and 4-isopropylcaprolactam. Mixtures of these lactams may also be used.

It is known that alkaline reacting substances, preferably alkali metals and alkaline earth metals, such as sodium, potassium, calcium, the hydrides and hydroxides of these metals, sodium or potassium compounds of alcohols, for example of methanol, ethanol, butanol, lauryl alcohol, cetyl alcohol and stearyl alcohol or Grignard compounds, may be used as polymerization catalysts. It is also known that reaction products of lactams with alkali or alkaline earth metals and their compounds having an alkaline reaction, such as are described in British patent specification No. 868,808, are particularly suitable as polymerization catalysts. The abovementioned catalysts are added to the lactam melts prior to their introduction into the stationary or rotatable molds in amounts of 0.01 to 5%, preferably 0.1 to 2%, by weight with reference to the total weight of lactam used, and uniformly distributed therein.

Examples of suitable substances known to be activators are derivatives of organic acids, such as halides, anhydrides, esters and nitriles, for example acetyl chloride, benzoyl bromide, terephthaloyl chloride, phthalic anhydride, succinic anhydride, triphenyl phosphate or butyl stearate, and also isocyanates and carbodiimides. Urea derivatives are particularly suitable, such as pyrrolidone-N-(carboxylic acid)-hexamethylenediamide-1,6, triphenylmethane, 4,4,'4'''-triscarbamidocaprolactam; N-substituted carbamic esters, such as ethyl N-phenylcarbamate, and also bisisoalkylurethanes, such as N,N'-hexamethylene-1,6-isopropylurethane. The activators are added as usual in amounts of from 0.5 to 10%, preferably from 0.4 to 5%, by weight with reference to the whole of the amount of lactam used for the polymerization.

Polymerization may be carried out in the presence of conventional additives, such as pigments, dyes, fillers, mineral substances having the effect of facilitating boiling, for example gypsum, and also fibers, fleeces, glass fibers or crosslinking agents, such as methylene biscaprolactam.

Examples of expanding agents are cyclohexane, gasoline and compounds which split off gas, such as acids and azo compounds.

The process according to this invention is particularly suitable for the preparation of practically stress-free large moldings, such as rollers, gear wheels and pipes.

Polyamide-based foams prepared according to this invention are suitable for all purposes where kinetic energy has to be absorbed, for example as lining material or upholstery in vehicles. They are also suitable for sound deadening purposes, for example as sound insulating material for engines which develop heat, because of their high thermal creep rupture strength.

The invention is further illustrated by the following examples. Parts specified in the examples are by weight.

EXAMPLE 1

Solution A 130 parts of ε-caprolactam is fused and 50 parts of a 17% solution of sodium ε-caprolactam in ε-caprolactam (prepared in a conventional manner) is added.

Solution B 25 parts of bis-ε-caprolactam-N-(carboxylic)-hexamethylene diamide-(1,6) and 7 parts of pentaerythritol triglycidyl ether are dissolved in a melt of 70 parts of ε-caprolactam. 2 parts of calcium sulfate (hemihydrate) is added.

Solution A and solution B are heated to 150° C. and combined, and 15 parts of ligroin and 5 parts of gasoline are added. The reaction mixture is poured into a metal mold having the dimensions 230 x 230 x 10 mm. which is then closed by a metal cover plate which is capable of being moved like a piston. The mold and cover plate have a temperature of 170° C. Polymerization and expansion are completed after about twenty seconds, the cover plate being lifted by the expansion of the polyamide foam.

A fine-pored viscoelastic polyamide foam is obtained (density 100 g./l.; compression set according to DIN 53,572 about 41%) which is particularly well suited for the manufacture of crash pads in motor vehicles.

If the above procedure is followed but without using any pentaerythritol triglycidyl ether in solution B, a polyamide foam having the same density but a compression set according to DIN 53,572 of only18% is obtained.

EXAMPLE 2

2800 parts of ε-caprolactam is melted in a stirred vessel and 36 parts of sodium caprolactam is added thereto at 125° C. A mixture of 100 parts of caprolactam, 59 parts of bis-(caprolactam-N-carboxylic acid)-hexamethylenediamide-(1,6) and 153 parts of a polyglycidyl ether of 2,2-bis-(p-hydroxyphenyl)-propane (bisphenol A) and epichlorohydrin which mixture has been previously prepared at 120° to 130° C. is stirred into the homogeneous melt and the melt is poured into a mold heated to 110°–130° C. The caprolactam polymerizes into a solid polyamide block in the course of 7 minutes. The product has an elongation at rupture (according to DIN 53,455) of 104%, no internal stresses and machines well under extreme conditions.

If the above procedure is followed but without the addition of the said polyglycidyl ether, a polymer is obtained which has an elongation at rupture (according to DIN 53,455) of only 26% and which, when machined, splinters readily or even tears.

EXAMPLE 3

1525 parts of caprolactam and 58 parts of sodium caprolactam are melted together and mixed intensely at 125° C. with a solution of 94 parts of bis-(caprolactam-N-carboxylic acid)-hexamethylenediamide-(1,6) and 31 parts of a polyglycidyl ether of pentaerythritol containing about 5% by weight of glycerol, and epichlorohydrin (epoxy value 0.62) in 1525 parts of caprolactam. The mixture is then poured into a mold kept at 110° C., where it begins to polymerize. It becomes viscous after 34 seconds and solid after 2 minutes. The resultant polyamide contains 2.9% by weight of extractables. The K value cannot be measured because the polymer does not dissolve in 96% sulfuric acid. The elongation at rupture of the polymer is 32%.

If the above procedure is followed but without the addition of the said polyglycidyl ether, a polymer is obtained which has an elongation at rupture (according to DIN 53,455) of only 22%.

EXAMPLE 4

1400 parts of caprolactam and 68 parts of sodium caprolactam are melted together and mixed thoroughly at 125° C. with a melt heated to the same temperature of 195 parts of bis-(caprolactam-N-carboxylic acid)-hexamethylenediamide-(1,6), 175 parts of a polyglycidyl ether of pentaerythritol containing about 5% by weight of glycerol, and epichlorhydrin (epoxy value 0.62), and 1340 parts of caprolactam. The resultant mixture is introduced into a mold heated to 110° C. where it immediately starts to polymerize. A solid polyamide block is obtained which does not have any internal stresses and which machines well. The elongation at rupture (according to DIN 53,455) of the polyamide is 104%.

If the above procedure is followed but without the addition of the said polyglycidyl ether, a product is obtained whose elongation at rupture (according to DIN 53,455) is about 23%.

EXAMPLE 5

Solution A 200 parts of caprolactam is melted and 26 parts of sodium caprolactam is added thereto.

Solution B 78 parts of bis-caprolactam-N-carboxylic acid)-hexamethylene-diamide-(1,6) and 44 parts of a polyglycidyl ether of pentaerythritol containing about 5% by weight of glycerol, and epichlorohydrin (epoxy value 0.62) are dissolved in a melt of 197 parts of caprolactam. 6 parts of calcium sulfate (hemihydrate) is added.

Solutions A and B are heated to 130° C. and further processed as described in Example 1 but with the addition of 10 parts of ligroin (boiling point 40°–60° C.) and 10 parts of gasoline (boiling point 60°–140° C.).

The mold and cover plate have a temperature of 150° C. The reaction mixture becomes viscous after about 15 seconds. Polymerization and expansion are completed after another 2 minutes.

A fine-pored viscoelastic polyamide foam having a density of 136 g./l. is obtained which is particularly siutable for the production of shock absorbent materials.

EXAMPLE 6

Solution A 250 parts of caprolactam is melted and 12 parts of sodium caprolactam is added thereto.

Solution B 20 parts of bis-(caprolactam-N-carboxylic acid)-hexamethylenediamide-(1,6) and 5 parts of a polyglycidyl ether of 2,2-bis(p-hydroxyphenyl)-propane (bisphenol A) and epichlorohydrin are dissolved in a melt of 220 parts of caprolactam. 6 parts of calcium sulfate (hemihydrate) is finally dispersed in this solution.

Solutions A and B are heated to 13° C. and combined, and further processed as described in Example 1 after the addition of 10 parts of ligroin and 10 parts of gasoline. Polymerization and expansion are over after about 55 seconds.

The resultant fine-pored viscoelastic foam has a density of 125 g./l. The compression set (according to DIN 53,572) measured at room temperature (23° C.) is 32%.

If the above procedure is followed but without the addition of the said polyglycidyl ether to solution B, a polyamide foam having a density of 126 g./l. but a compression set (according to DIN 53,572) of only 19% is obtained.

EXAMPLE 7

Solution A 200 parts of caprolactam is melted and 43 parts of sodium caprolactam is added thereto.

Solution B 160 parts of caprolactam is melted and 98 parts of bis-(caprolactam-carboxylic acid)-hexamethylenediamide - 1,6), 3.6 parts of 1,3-butadiene diepoxide and 6 parts of calcium sulfate (hemihydrate) are added thereto.

Solutions A and B are heated to 130° C. and combined. 10 parts of ligroin and 10 parts of gasoline are added and the whole is introduced into a mold which has been heated to 170° C. The reaction mixture becomes viscous after 20 seconds. Polymerization and expansion are completed after another 40 seconds.

A fine-pored viscoelastic polyamide foam having a density of 128 g./l. is obtained.

We claim:
1. In a process for the production of polyamide moldings by activated anionic polymerization of a lactam having seven to thirteen ring members in the presence of an anionic catalyst and a cocatalyst in a mold, the improvement which comprises carrying out the polymerization of said lactam in the presence of, and reacting therewith during the polymerization reaction, 1–10% by weight, based on said lactam, of a low molecular weight epoxide compound having two or three epoxy groupings and having the formula

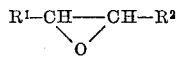

or

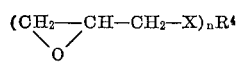

wherein $R^1$ denotes a hydrogen atom or a hydrocarbon radical having up to 20 carbon atoms, $R^2$ denotes a hydrocarbon radical bearing an epoxy group and having 2 to 20 carbon atoms, with the proviso that $R^1$ and $R^2$ may be joined together as part of a cyclic hydrocarbon ring, X denotes —O—, —S— or >$NR^3$ with $R^3$ being an aliphatic hydrocarbon radical having one to six carbon atoms, $R^4$ denotes an aliphatic hydrocarbon radical having 2 to 20 carbon atoms or a hydroxyl group-bearing aliphatic hydrocarbon radical having up to 5 carbon atoms, and $n$ denotes 2 or 3.

2. A process as claimed in claim 1, wherein an epoxide having the formula:

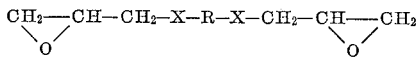

wherein X denotes —O—, —S— or —$NR^1$— with $R^1$ being an aliphatic hydrocarbon radical having 1 to 6 carbon atoms and R denotes a divalent hydrocarbon radical having 2–20 carbon atoms and/or an epoxide having the formula:

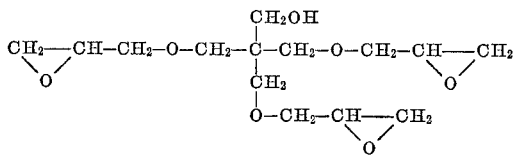

is used.

3. A process as claimed in claim 1, wherein a low molecular weight diglycidyl ether of bis-(p-hydroxyphenyl)-alkane is used.

4. A process as claimed in claim 1 wherein said polymerization reaction is carried out in a mold with a foaming agent in the reaction mixture, and the polymerization mass is foamed by evolution of gas from said foaming agent to produce a viscoelastic foamed polyamide.

References Cited

UNITED STATES PATENTS

| | | | |
|---|---|---|---|
| 3,017,391 | 1/1962 | Mottus et al. | 260—78L |
| 3,038,885 | 6/1962 | Best | 260—78L |
| 3,206,418 | 9/1965 | Giberson | 260—2.5N |
| 3,232,892 | 2/1966 | Fisher | 260—2.5N |
| 3,236,789 | 2/1966 | Fuller | 260—2.5N |
| 3,341,501 | 9/1967 | Hedrick et al. | 260—78L |
| 3,344,107 | 9/1967 | Miller | 260—78LX |
| 3,458,481 | 7/1969 | Reichold et al. | 260—78L |

WILLIAM H. SHORT, Primary Examiner

L. M. PHYNES, Assistant Examiner

U.S. Cl. X.R.

260—78, 830, 857

PO-1050
(5/69)

UNITED STATES PATENT OFFICE
CERTIFICATE OF CORRECTION

Patent No. 3,565,834          Dated February 23, 1971

Inventor(s) Karl Dachs et al

It is certified that error appears in the above-identified patent and that said Letters Patent are hereby corrected as shown below:

Column 1, line 26, "applicataion" should read -- application

Column 5, line 8, "0.5" should read -- 0.05 --.

Column 6, line 53, "caprolactam" should read -- (caprolactam

Signed and sealed this 3rd day of August 1971.

(SEAL)
Attest:

EDWARD M. FLETCHER, JR.          WILLIAM E. SCHUYLER, JR.
Attesting Officer          Commissioner of Patents